(12) United States Patent
Brennom

(10) Patent No.: US 7,770,613 B2
(45) Date of Patent: Aug. 10, 2010

(54) METHOD AND APPARATUS FOR LOADING CATALYST

(75) Inventor: Stephen Brennom, Pasadena, TX (US)

(73) Assignee: Clean Harbors Catalyst Technologies, LLC, Pasadena, TX (US)

( * ) Notice: Subject to any disclaimer, the term of this patent is extended or adjusted under 35 U.S.C. 154(b) by 495 days.

(21) Appl. No.: 10/554,065

(22) PCT Filed: Apr. 21, 2004

(86) PCT No.: PCT/US2004/012390

§ 371 (c)(1),
(2), (4) Date: Dec. 14, 2006

(87) PCT Pub. No.: WO2004/096428

PCT Pub. Date: Nov. 11, 2004

(65) Prior Publication Data

US 2007/0084519 A1    Apr. 19, 2007

(51) Int. Cl.
*B67C 3/26* (2006.01)
(52) U.S. Cl. .................. 141/250; 141/73; 141/284; 141/286
(58) Field of Classification Search .......... 141/1, 141/11, 12, 71, 73, 250–263, 284, 286; 222/406, 222/407, 564; 239/379; 366/332, 318
See application file for complete search history.

(56) References Cited

U.S. PATENT DOCUMENTS

| | | | |
|---|---|---|---|
| 1,506,142 | A | 8/1924 | Stubbs |
| 2,114,103 | A | 4/1938 | Driscoll et al. |
| 2,295,529 | A | 9/1942 | Gooden |
| 2,330,862 | A | 10/1943 | Bleam |
| 3,166,303 | A | 1/1965 | Chapman |
| 3,249,342 | A | 5/1966 | Mikkelsen |

(Continued)

FOREIGN PATENT DOCUMENTS

EP    0 522 858 A    1/1993

(Continued)

OTHER PUBLICATIONS

PCT IPRP, International Application No. PCT/US04/12390, dated Apr. 3, 2006.

(Continued)

*Primary Examiner*—Timothy L Maust
(74) *Attorney, Agent, or Firm*—Patterson & Sheridan, LLP

(57) ABSTRACT

Methods and apparatus are disclosed for filling solid particles into a vertical tube by conveying the particles downwardly into the tube along a loading tool that softens the fall of the particles and provides even filling of the tube. The loading tool includes a center member and a plurality of damper members that can be adapted in particular cases to the actual type of particles and the tube diameter. The damper members can be stiff or flexible since they do not occupy a substantial portion of the cross section of the tube at any particular axial location. In operation, the center member can be jerked during the filling operation while simultaneously being lifted up gradually as the tube fills or it can be sequentially lifted. The damper members reduce the falling velocity of the particles and divert the particles from falling in straight downward paths. This avoids bridge formation and breakage of the particles during filling.

24 Claims, 1 Drawing Sheet

U.S. PATENT DOCUMENTS

| | | | | |
|---|---|---|---|---|
| 3,608,751 | A * | 9/1971 | Hundtofte | 414/287 |
| 3,749,258 | A * | 7/1973 | James | 414/808 |
| 4,074,836 | A * | 2/1978 | Muller, Jr. | 222/564 |
| 4,077,530 | A | 3/1978 | Fukusen et al. | |
| 4,306,829 | A * | 12/1981 | Loutaty et al. | 414/301 |
| 4,472,063 | A * | 9/1984 | Eickelmann | 366/129 |
| 4,564,328 | A | 1/1986 | Loutaty et al. | |
| 4,575,255 | A * | 3/1986 | Kafka | 366/129 |
| 4,786,001 | A | 11/1988 | Ephraim et al. | |
| 4,821,782 | A | 4/1989 | Hyer | |
| 5,247,970 | A * | 9/1993 | Ryntveit et al. | 141/1 |
| 5,482,367 | A * | 1/1996 | Khan et al. | 366/129 |
| 5,795,550 | A * | 8/1998 | Minami | 422/219 |
| 5,865,539 | A * | 2/1999 | Rogers | 366/325.8 |
| 5,938,325 | A * | 8/1999 | Edwards | 366/129 |
| 6,467,513 | B1 * | 10/2002 | Yanaru et al. | 141/12 |
| 6,619,833 | B1 * | 9/2003 | Skudelny | 366/129 |
| 6,764,704 | B2 * | 7/2004 | Schub | 426/474 |
| 6,863,430 | B2 * | 3/2005 | Berube | 366/129 |
| 7,220,047 | B2 * | 5/2007 | Wanat | 366/129 |
| 7,303,329 | B1 * | 12/2007 | Flynn | 366/129 |
| 7,329,040 | B2 * | 2/2008 | Elrod | 366/129 |
| 2006/0213575 | A1 * | 9/2006 | McNaughton | 141/286 |

FOREIGN PATENT DOCUMENTS

| | | |
|---|---|---|
| EP | 0 548 999 A | 6/1993 |
| EP | 1 283 070 A | 2/2003 |
| GB | 2 330 828 A | 5/1999 |
| JP | 52003579 | 1/1977 |
| JP | 05-031351 | 2/1993 |
| JP | 2000237577 | 9/2000 |
| WO | WO 00/44488 | 8/2000 |

OTHER PUBLICATIONS

PCT International Search Report from International Application No. PCT/US2004/012390 dated Sep. 2, 2004.

Australian Office Action, Application No. 2004234365, dated Jul. 17, 2009.

Japanese Office Action for Japanese Application No. 2006-513209 dated Jan. 19, 2010.

PCT International Search Report for International Application No. PCT/US07/63718 dated May 5, 2008.

* cited by examiner

METHOD AND APPARATUS FOR LOADING CATALYST

BACKGROUND OF THE INVENTION

1. Field of the Invention

Embodiments of the present invention generally relate to methods and apparatus for filling particulate material into a tube. More particularly embodiments of the present invention generally relate to methods and apparatus for filling a catalyst into a tube of a primary reformer furnace.

2. Description of the Related Art

Primary reformer furnaces such as those used in the production of ammonia, hydrogen and methanol typically utilize tens or hundreds of heat transfer tubes that are filled with catalyst particles. These tubes must initially be filled with catalyst, and used catalyst must be replaced with fresh catalyst periodically. Voids in the catalyst fill can easily form if catalyst particles are introduced to the tubes too quickly or non-uniformly during the filling of the tubes. Also, catalyst particles can fracture or crush if they are allowed to free-fall too far during filling of the tubes. Voids or crushed catalyst create local density variations as well as a catalyst density that is less than optimal. Local density variations differ from tube to tube and cause variations in the pressure drop over the tubes. This results in distortions of gas distribution in a multi-tube reactor and causes uneven temperature distribution over the tubes during operation of the reactor. The resultant thermal and mechanical stress in the tube can reduce its useful life. To reduce voids the tube ban be vibrated by such methods as tapping or vibrating the upper part of the tube. However, this is laborious and delays the filling operation. Additionally, tapping or vibration can expose the tube to extra mechanical stress. If excessive crushing or fracturing of catalyst particles occurs during filling, the only remedy is to remove all catalyst from the tube and refill it properly. This adds substantial labor and results in the loss of expensive catalyst One method for reducing density variations utilizes a short sock or sock-like member made of a material such as a soft plastic that is first filled with the catalyst. The catalyst can be delivered from the manufacturer already in the socks. When filling the tubes, a sock filled with catalyst is fastened onto a line and lowered towards the bottom of each tube. By jerking the line, the sock opens at its bottom and the catalyst flows into the tube with a minimum of free fall. However, there are several disadvantages with this method. Filling one tube with this method usually requires a number of the socks thereby making the method laborious. Sometimes, the sock will open prematurely, allowing the catalyst particles to fall a great distance and achieve enough gravimetrically induced velocity to crush or fracture when they hit the bottom of a tube. If the sock contains voids among the particles of catalyst, then corresponding voids will typically form in the tube when the sock is emptied. Consequently, the tubes must be exposed to tapping or vibrating to secure reasonably even gas distribution over the tubes.

Another method for attaining good and even packing of catalyst into a tube includes filling the tube with water and then pouring in the catalyst. However, this method requires that the water subsequently be completely removed. Removal of the water and necessary subsequent drying takes a long time. Additionally, used water requires special treatment, adding time and cost.

RD Patent Application RD-253040-A describes a method for filling a tube with a catalyst by adding the catalyst to the upper part of the tube by means of a transporter comprising a slowly rotating arrangement. The catalyst is transported from a container through a duct in which there is a rod with oblique/transverse propeller wings or brushes. The catalyst particles are then transported to the upper end of the catalyst tube and fall smoothly into the tube. However, the particles must be added slowly in order to get even filling of the tube. Further, the catalyst drops a significant length especially during the first part of the filling operation thereby permitting the catalyst to be crushed or broken during the fall. Therefore, the particles can pack unevenly over the vertical length of the tube and the filling time can be long.

Therefore, there exists a need for a catalyst loading tool that is cost effective to manufacture and is easily configurable to accommodate particular loading requirements for a given reactor. There exists a further need for a catalyst loading tool that permits filling of reactor tubes evenly without breaking the catalyst particles.

SUMMARY OF THE INVENTION

Embodiments of the present invention generally relate to methods and apparatus that prevent breakage of a catalyst particle and evenly fill the catalyst into tubes to an optimum density. Particles of catalyst can empty directly down into the tubes in order to obtain quick filling of the tubes. However, a loading tool softens the fall of the catalyst and provides even filling of the tube in order to avoid crushing or breaking of the catalyst and the formation of catalyst voids in the tube. The loading tool comprises a center member, such as a rod, a wire, a chain, or the like with a plurality of damper members shaped in different ways but each having a radial extension smaller than the inner radius of the tube. In operation, the center member can be jerked during the filling operation while simultaneously being lifted up gradually as the tube fills. Alternatively, the center member can remain stationary with its lowest extremity slightly above the anticipated fill level of the catalyst being added. In either type of operation, limited, pre-determined amounts of catalyst are introduced sequentially to allow periodic adjustment of the position of the lowest extremity of the center member. The damper members reduce the falling velocity of the catalyst and divert the catalyst from falling in straight downward paths. This avoids bridge formation of the catalyst particles during filling. The type and shape of the damper member and center member can be adapted in particular cases to the actual type of catalyst particles and the tube diameter. The damper members can be stiff or flexible since they do not occupy a substantial portion of the cross section of the tube at any particular axial location. The height of the lowest extremity of the center member can be periodically adjusted manually by physically feeling the center member change from tension to slackness as the lowest extremity of the center member contacts the catalyst interface. In another embodiment of the present invention, a sensor member can be positioned at a lower portion of the center member to communicate with the top of the center member to provide visual or auditory indication of contact with the catalyst interface.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
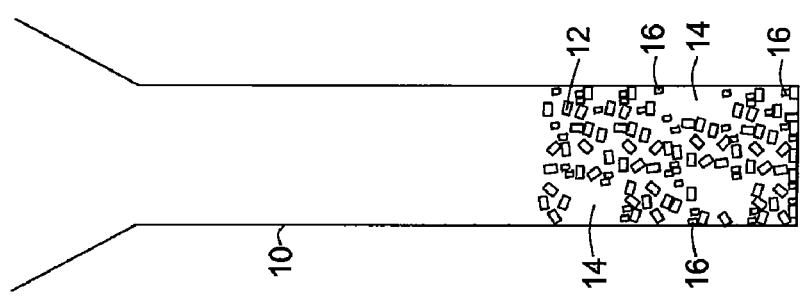
FIG. 1 is a schematic view showing a tube filled in a conventional manner.

FIG. 1 shows a tube 10 such as a catalyst tube of a reactor. As illustrated, filling the tube 10 by allowing the particles 12 to fall directly down the tube produces voids 14 and broken particles 16.

Figure 2:
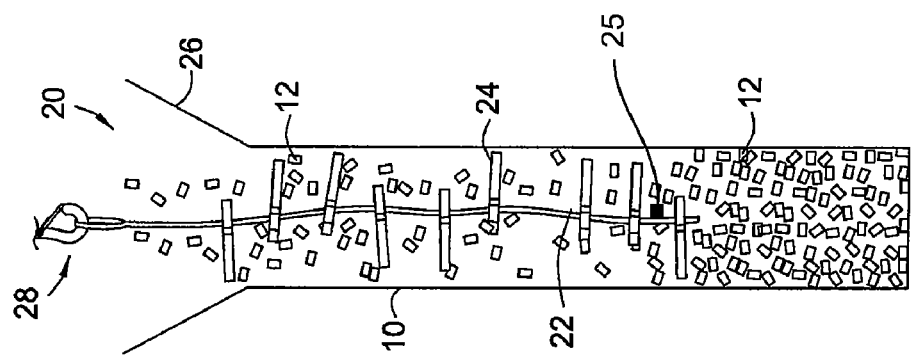
FIG. 2 is a schematic view showing a tube filled in accordance with an embodiment of the invention.

FIG. 2 shows particles 12 such as catalyst falling into a tube 10 that includes a loading tool 20. The loading tool 20 comprises a center member 22 such as a wire, a chain, a rod, or the like and a plurality of damper members 24 substantially transverse and axially arranged on the center member 22 to provide substantially circumferential coverage along a longitudinal length of the tube 10. The center member 22 can be stiff or flexible. The distance between damper members 24 on the center member 22 can be substantially equal or can vary. The plurality of damper members 24 reduces the falling velocity of the particles 12 and diverts the particles from falling in straight downward paths. Since the damper members 24 do not occupy a substantial portion of the cross section of the tube 10 at any particular axial location they can be stiff or flexible and still permit the particles 12 to fall. The loading tool 20 can be moved or jerked primarily in both directions axially and is pulled gradually out of the tube 10 as the tube is filled, or it can remain stationary while catalyst is being added and then pulled upwards in the tube between catalyst filling sequences. As the loading tool 20 is removed from the tube 10, it can be broken into sections at a coupling 28 such as an eyelet and mating shackle that can be positioned within the center member 22. Therefore, the amount of the loading tool 20 that has to be handled outside of the tube 10 is limited to the length between couplings 28 on the center member 22. The particles 12 can pour down into the tube 10 through a funnel 26 that is removed after filling is completed. However, the particles 12 can be added to the tube through other methods known in the art.

Figure 3:
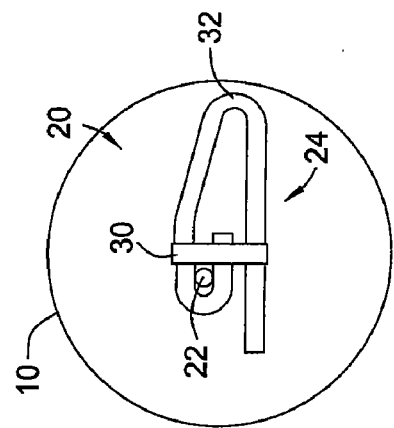
FIG. 3 is a view of a damper member attached to a center member in accordance with an embodiment of the invention.

FIG. 3 illustrates an embodiment for the damper member 24. As shown, the damper member 24 is an inexpensive and easily adjustable commercially available fastener having a locking portion 30 that attaches a longitudinal member 32 around the center member 22 of the loading tool 20. Additionally, the longitudinal member 32 can pass back through a portion of the locking portion 30 in order to form a loop on one side thereof. The locking portion 30 and longitudinal member 32 of the damper member 24 can be made of a metal or plastic with varying degrees of stiffness. Shaping of the damper member 24 and changes to length, stiffness, number, axial spacing on the center member 22, etc., can be adapted to the material to be filled into the tube 10 and the size of the tube 10. These changes can be accomplished since the damper member 24 is cheap and can be adjusted easily.

Periodic adjustments of the height of the lowest extremity of the center member 22 can be made manually. This is accomplished by physically feeling the center member 22 change from tension to slackness as the lowest extremity of the center member 22 contacts the catalyst interface, similar to the sensation from a weighted fishing line contacting the bottom of a body of water. In one embodiment of the present invention, periodic adjustments also can be assisted by the addition of a sensor member 25 (shown in FIG. 2) at the lowest extremity of the center member 22. This sensor member 25 can communicate with the top of the center member 22 to provide visual or auditory indication of contact with the catalyst interface.

With embodiments of the present invention, a novel, reproducible, and quick filling method is disclosed. The method is gentle to the particles such that crushing of particles during the filling operation is avoided. An even filling of the tube is also obtained, and thus one result has been avoidance of uneven temperature distribution when a tube filled with catalyst is in operation. Further, an even density of particles in the tubes is attained without exposing them to tapping/vibration, which is both time-consuming and damaging to the tubes. Consequently, time is saved both during filling and also since the tubes do not have to be tapped. The method is simple, cost efficient, and can be modified both quickly and easily. Additionally, it is to only a very small degree dependent upon whoever is the particular operator during the filling process. Furthermore, errors connected with filling of particles into socks are avoided. A substantial degree of freedom regarding packaging and the form of transport for the particles also is obtained.

While the foregoing is directed to embodiments of the present invention, other and further embodiments of the invention may be devised without departing from the basic scope thereof, and the scope thereof is determined by the claims that follow.

The invention claimed is:

1. An apparatus for distributing solid particles into a tube, comprising:
   a center member; and
   a plurality of damper members connected to the center member, each one of the damper members forming a loop that extends in a radial direction away from the center member toward an inside diameter of the tube, wherein each of the plurality of damper members includes a locking portion that attaches a longitudinal member around the center member, and wherein the longitudinal member passes back through a section of the locking portion to form the loop.

2. The apparatus of claim 1, wherein the center member comprises at least one of a wire, a chain, and a rod.

3. The apparatus of claim 1, wherein the plurality of damper members are made of plastic.

4. The apparatus of claim 1, wherein at least one damper member is rotationally distinct from adjacent damper members on both sides thereof.

5. The apparatus of claim 1, wherein a size of the loop is adjustable to accommodate the distribution of different sized solid particles.

6. The apparatus of claim 1, wherein the loop includes a substantially horizontal orientation relative to the longitudinal axis of the center member.

7. The apparatus of claim 1, wherein the plurality of damper members are arranged on the center member to provide substantially circumferential coverage along a longitudinal length of the tube.

8. The apparatus of claim 7, wherein individual ones of the plurality of damper members are axially spaced from one another along the center member.

9. The apparatus of claim 8, wherein the loop extends in a radial direction on substantially only one 180 degree radius of the center member such that the damper member itself lacks substantial coverage of a cross section of the tube.

10. A method for distributing solid particles into a tube comprising:

positioning a loading tool in an interior of the tube, the loading tool having a center member and a plurality of damper members connected to the center member, each one of the damper members forming a loop that extends in a radial direction away from the center member toward an inside diameter of the tube, wherein each of the plurality of damper members includes a locking portion that attaches a longitudinal member around the center member, and wherein the longitudinal member passes back through a section of the locking portion to form the loop;

filling the tube with the solid particles, wherein the solid particles contact at least some of the plurality of damper members; and removing the loading tool from the tube as the solid particles fill the tube.

11. The method of claim 10, further comprising utilizing a sensor to communicate the position of a second portion of the center member to a first portion of the center member.

12. The method of claim 11, wherein the second portion of the center member is located at a lowest extremity of the center member.

13. The method of claim 11, wherein the first portion of the center member is located at an upper portion of the center member.

14. The method of claim 10, further comprising breaking the center member into sections as the loading tool is removed from the tube.

15. The method of claim 10, further comprising breaking the center member into sections at an eyelet and mating shackle within the center member as the loading tool is removed from the tube.

16. The method of claim 10, wherein the center member comprises at least one of a wire, a chain, and a rod.

17. The method of claim 10, wherein the plurality of damper members are made of plastic.

18. The method of claim 10, wherein removing the loading tool includes pulling the loading tool upwards between catalyst filling sequences without removing the loading tool during the catalyst filling sequences.

19. The method of claim 10, wherein the loop includes a substantially horizontal orientation relative to the longitudinal axis of the center member.

20. The method of claim 10, wherein the plurality of damper members are arranged on the center member to provide substantially circumferential coverage along a longitudinal length of the tube.

21. The method of claim 20, wherein individual ones of the plurality of damper members are axially spaced from one another along the center member.

22. The method of claim 21, wherein the loop extends in a radial direction on substantially only one 180 degree radius of the center member such that the damper member itself lacks substantial coverage of a cross section of the tube.

23. A method for distributing solid particles into a tube, comprising:

positioning a loading tool in an interior of the tube, the loading tool having a center member and a plurality of damper members connected to the center member and arranged on the center member to provide substantially circumferential coverage along a longitudinal length of the tube, wherein individual ones of the plurality of damper members are axially spaced from one another along the center member and each one extends in a radial direction away from the center member toward an inside diameter of the tube on substantially only one 180 radius of the center member such that the damper member itself lacks substantial coverage of a cross section of the tube;

filling the tube with the solid particles, wherein the solid particles contact the plurality of damper members;

removing the loading tool from the tube as the solid particles fill the tube;

breaking the center member into sections as the loading tool is removed from the tube; and utilizing a sensor to communicate the position of a second portion of the center member to a first portion of the center member.

24. A method for distributing solid particles into a tube, comprising:

positioning a loading tool in an interior of the tube, the loading tool having a center member and a plurality of damper members connected to the center member and arranged on the center member to provide substantially circumferential coverage along a longitudinal length of the tube, wherein individual ones of the plurality of damper members are axially spaced from one another along the center member and each one extends in a radial direction away from the center member toward an inside diameter of the tube on substantially only one 180 radius of the center member such that the damper member itself lacks substantial coverage of a cross section of the tube;

filling the tube with the solid particles, wherein the solid particles contact the plurality of damper members;

removing the loading tool from the tube as the solid particles fill the tube;

breaking the center member into sections at an eyelet and mating shackle within the center member as the loading tool is removed from the tube; and utilizing a sensor to communicate the position of a second portion of the center member to a first portion of the center member.

* * * * *